July 1, 1924.  
E. L. CHOTT  
TEETH CLEANING INSTRUMENT  
Filed Oct. 13, 1923  
1,499,345

Witnesses:

Inventor:
Edward L. Chott
By Joshua R H 
his Attorney.

Patented July 1, 1924.

1,499,345

UNITED STATES PATENT OFFICE.

EDWARD L. CHOTT, OF CHICAGO, ILLINOIS.

TEETH-CLEANING INSTRUMENT.

Application filed October 13, 1923. Serial No. 668,262.

*To all whom it may concern:*

Be it known that I, EDWARD L. CHOTT, a citizen of the United States, and a resident of the city of Chicago, county of Cook, and State of Illinois, have invented certain new and useful Improvements in Teeth-Cleaning Instruments, of which the following is a specification.

My invention relates to improvements in teeth cleaning instruments, for use by dentists and has for its object the provision of an improved construction of this character which is efficient in use and capable of economical manufacture.

Other objects will appear hereinafter.

The invention consists in the combinations and arrangements of parts hereinafter described and claimed.

Figure 1:
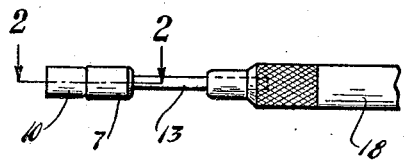
Figure 2:
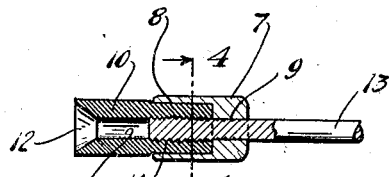
Figure 3:
Figure 4:
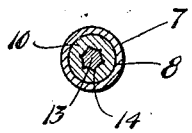
Figure 5:
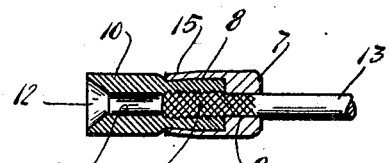
Figure 6:
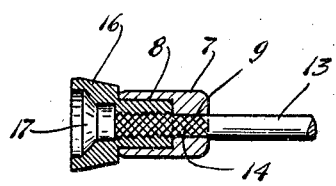

The invention will be best understood by reference to the accompanying drawings forming a part of this specification, and in which, Fig. 1 is a side view of an instrument embodying the invention shown in position of use;

Fig. 2, an enlarged section taken on line 2—2 of Fig. 1;

Fig. 3, an enlarged view of the stem employed in the construction;

Fig. 4, a section taken on line 4—4 of Fig. 2;

Fig. 5, a view similar to Fig. 2, but showing a slightly modified form of construction; and, Fig. 6, a similar view showing another modified form of construction.

The form of construction illustrated in Figs. 1 to 4, inclusive, comprises a metallic head 7 having a socket 8 in one end and a bore 9 extending centrally through the other end thereof and into the bottom of said socket. A contact piece 10 in the form of a section of rubber tubing is secured in said head as shown. The tubing 10 is provided with a central bore 11 aligning with the bore 9 and the outer end 12 of said bore is outwardly flared. A stem 13 in the form of a metal rod is inserted in the bores in the head and rubber tubing to hold the tubing in place and also constitute a shank for mounting the instrument for use. The portions 14 of the stem 13 within the bores in the head and tubing are knurled or otherwise roughened to hold the parts in place.

In assembling the parts, the tubing 10 is first forced into the socket 8 and the stem 13 is then driven or otherwise forced through the tubing until the knurled end comes substantially flush with the mouth of socket 8 as shown. The knurling tends to hold the parts in place by increasing the frictional engagement therewith. The outward flare 12 in the bore in the contact piece 10 increases the flexibility of the end of the contact piece and thus facilitates application to the teeth and under the edges of the gums. The comparatively small central bore in the contact piece 10 serves to retain the abrasive employed and automatically feed the same to the surface contacting with the tubing.

In the modified form of construction illustrated in Fig. 5, the head 7 is swaged or otherwise compressed inwardly to compress the inserted portion of the rubber tubing more tightly about the knurled end of the stem 13, and thus hold the same more securely in place.

In the modified form of construction illustrated in Fig. 6, the outer end of the rubber tubing is enlarged into a head 16 and the bore 17 is enlarged and stepped as shown, thus giving greater area of contact.

The instrument is employed in conjunction with the usual flexible dental shaft 18 the stem or shank 13 being mounted therein in the usual way.

By this arrangement a tool is provided which may be manufactured and sold so cheaply that a dentist can afford to discard the tool after use on each patient and thus avoid all danger of transferring infection from one patient to another.

While I have illustrated and described the preferred forms of construction for carrying my invention into effect, these are capable of variation and modification without departing from the spirit of the invention. I therefore do not wish to be limited to the precise details of construction set forth, but desire to avail myself of such variations and modifications as come within the scope of the appended claims.

Having described my invention what I claim as new and desire to secure by Letters Patent, is:

1. A device of the class described comprising a head having a socket at one end and a bore extending through the other end thereof and into the bottom of said socket; a tubular contact piece inserted in said socket with its bore in alignment with the bore in said head; and a stem inserted through the bore in said head and into the bore in said contact piece and constituting a stem for mounting said head, substantially as described.

2. A device of the class described comprising a head having a socket at one end and a bore extending through the other end thereof and into the bottom of said socket; a tubular contact piece inserted in said socket with its bore in alignment with the bore in said head; and a stem inserted through the bore in said head and into the bore in said contact piece and constituting a stem for mounting said head, the portions of said stem within said bores being roughened, substantially as described.

3. A device of the class described comprising a head having a socket at one end and a bore extending through the other end thereof and into the bottom of said socket; a tubular contact piece inserted in said socket with its bore in alignment with the bore in said head; and a stem inserted through the bore in said head and into the bore in said contact piece and constituting a stem for mounting said head, and the walls of said socket being compressed inwardly to compress the inserted portion of said contact piece about said stem, substantially as described.

4. A device of the class described comprising a head having a socket at one end and a bore extending through the other end thereof and into the bottom of said socket; a tubular contact piece inserted in said socket with its bore in alignment with the bore in said head; and a stem inserted through the bore in said head and into the bore in said contact piece and constituting a stem for mounting said head, the portions of said stem within said bores being roughened, and the walls of said socket being compressed inwardly to compress the inserted portion of said contact piece about said stem, substantially as described.

5. A device of the class described comprising a head having a socket at one end and a bore extending through the other end thereof and into the bottom of said socket; a contact piece consisting of a section of rubber tubing inserted in said socket with the bore of said tubing in alignment with the bore in said head; and a stem inserted through the bore in said head and into the bore in said tubing and constituting a stem for mounting said head, the portions of said stem within said bores being roughened and the walls of said socket being compressed inwardly to compress the inserted portion of said tubing about said stem, substantially as described.

6. A device of the class described comprising a head having a socket at one end and a bore extending through the other end thereof and into the bottom of said socket; a contact piece consisting of a section of rubber tubing inserted in said socket with a bore of said tubing in alignment with the bore in said head; and a stem inserted through the bore in said head and into the bore in said tubing and constituting a stem for mounting said head, the portions of said stem within said bores being roughened and the walls of said socket being compressed inwardly to compress the inserted portion of said tubing about said stem, and the outer end of the bore in said tubing being outwardly flared, substantially as described.

In testimony whereof I have signed my name to this specification in the presence of two subscribing witnesses.

EDWARD L. CHOTT.

Witnesses:
   JOSHUA R. H. POTTS,
   FREDA C. APPLETON.